US010787353B2

(12) United States Patent
Schoenfelder (10) Patent No.: US 10,787,353 B2
(45) Date of Patent: Sep. 29, 2020

(54) CLOSURE HEAD FOR CLOSING A CONTAINER HAVING A CONTAINER CLOSURE

(71) Applicant: KRONES AG, Neutraubling (DE)

(72) Inventor: Markus Schoenfelder, Neutraubling (DE)

(73) Assignee: KRONES AG, Neutraubling (DE)

( * ) Notice: Subject to any disclaimer, the term of this patent is extended or adjusted under 35 U.S.C. 154(b) by 213 days.

(21) Appl. No.: 15/579,807

(22) PCT Filed: Apr. 18, 2017

(86) PCT No.: PCT/EP2017/059151
§ 371 (c)(1),
(2) Date: Mar. 5, 2018

(87) PCT Pub. No.: WO2017/182453
PCT Pub. Date: Oct. 26, 2017

(65) Prior Publication Data
US 2018/0354765 A1 Dec. 13, 2018

(30) Foreign Application Priority Data

Apr. 18, 2016 (DE) ......................... 10 2016 107 167

(51) Int. Cl.
*B67B 3/20* (2006.01)
*B25J 15/04* (2006.01)
(52) U.S. Cl.
CPC ......... *B67B 3/2066* (2013.01); *B25J 15/0408* (2013.01); *B67B 2201/10* (2013.01)
(58) Field of Classification Search
CPC .... B25J 15/0028; B25J 15/0226; B25J 15/04; B25J 15/0408; B25J 15/0416; B25J 15/0425; B25J 15/0475; B67B 3/2066; B67B 2201/10; B65B 7/2835
USPC ........................................................ 294/116
See application file for complete search history.

(56) References Cited

U.S. PATENT DOCUMENTS 3,135,396 A * 6/1964 Grainger ................. G21F 7/061
414/8
4,232,499 A 11/1980 Holstein
4,660,274 A * 4/1987 Goumas ............. B23Q 3/15506
294/119.1
(Continued)

FOREIGN PATENT DOCUMENTS

CN 2332705 8/1999
CN 2937088 8/2007
(Continued)

OTHER PUBLICATIONS

Office Action in related Chinese Patent Application No. 201780001949.5, dated Mar. 7, 2019, 7 pages.

*Primary Examiner* — Dean J Kramer
(74) *Attorney, Agent, or Firm* — Haynes and Boone, LLP (57) ABSTRACT

A closure head for closing a container with a container closure, for example for closing a container with a screw closure in a beverage filling system is described. The closure head includes a gripping mechanism for gripping the container closure with at least one gripping arm that can be pivoted about a bearing, and a holding jaw disposed on the gripping arm for holding the container closure. The holding jaw is locked on the gripping arm by means of a pretensioned pressure pin.

18 Claims, 8 Drawing Sheets

(56) References Cited

U.S. PATENT DOCUMENTS

| | | | | |
|---|---|---|---|---|
| 4,905,447 | A | * | 3/1990 | Margaria .............. B67B 3/2066 53/317 |
| 5,851,042 | A | * | 12/1998 | Bankuty ................ B65G 47/90 294/106 |
| 8,220,225 | B1 | | 7/2012 | Zemlin |
| 8,375,682 | B2 | | 2/2013 | Zanini et al. |
| 9,010,819 | B2 | * | 4/2015 | Mueller ................ B65G 11/023 294/86.4 |
| 9,845,230 | B2 | * | 12/2017 | Groningen ............ B67B 3/2066 |
| 2009/0315281 | A1 | * | 12/2009 | Tuauden ................ B65G 47/90 279/142 |

FOREIGN PATENT DOCUMENTS

| | | |
|---|---|---|
| CN | 101772455 | 7/2010 |
| CN | 101772466 | 7/2010 |
| CN | 103781704 | 5/2014 |
| CN | 103803459 | 5/2014 |
| EP | 2301885 | 3/2011 |
| FR | 2947247 | 12/2010 |
| WO | WO 2009/016501 | 2/2009 |

\* cited by examiner

CLOSURE HEAD FOR CLOSING A CONTAINER HAVING A CONTAINER CLOSURE

CROSS REFERENCE TO RELATED APPLICATIONS

This application is a national stage of International Application No. PCT/EP2017/059151, filed Apr. 18, 2017, which claims priority from German Patent Application No. 10 2016 107 167.6 filed on Apr. 18, 2016 in the German Patent and Trademark Office, the disclosures of which are incorporated herein by reference in their entirety.

BACKGROUND

Technical Field

The invention relates to a closure head for closing a container with a container closure, for example for closing a container with a screw closure in a beverage filling system, generally for closing a container with a screw closure in an aseptic beverage filling system.

Related Art

Closure heads for closing containers with a container closure are well known from the state of the art. In such closure heads, a container closure, supplied for example via a picking wheel, is gripped by clamping jaws of the closure head to remove it from the picking wheel, and then held on the closure head. When provided with the container closure, the closure head is then positioned over the container that is to be closed, and lowered onto the container in order to close the container with the container closure. If a screw closure is to be applied to the container, the closure head undergoes not only the lowering movement but also a rotary movement. By means of the combination of lowering and rotation, the container closure can be screwed onto the container.

In addition, the state of the art provides systems that allow an exchange of the closing-related components of the closure heads, in order enable the application of container closures with differing geometries using the same closure head. The exchange of these known components is time-consuming, since for this purpose an operator usually needs to enter the clean room of the machine in order to complete the exchange of the closure-related parts.

EP 0 876 991 B1 discloses a device for screwing a cap onto a neck of a container, comprising gripper means that are pivotable about horizontal axes and are provided with clamping jaws for clamping the cap. A similar design is exhibited by the screwing and rolling head for applying threaded caps which is known from EP 1 908 725 B1.

U.S. Pat. No. 5,851,042 A discloses a collet for gripping container caps, which can be quickly exchanged by means of a securing pin on a closure gripping system. To clamp the container lid, the segments of the collet are pivoted inwards by means of a pressure cylinder in order to enable the container lid to be gripped. This approach permits the treatment only of container lids with a similar geometry, even when the collet is exchanged for one with a differing geometry. In addition, if the loads on the components, in particular the segments, are to be slight, as is required for sustained operation, only slight pressures or clamping forces can be applied to the container lid. Furthermore, due to its many indentations and sliding surfaces, among other reasons, this system is only to a very limited degree suitable for use in antiseptic plants.

SUMMARY

An improved closure head for closing a container with a container closure is described.

Accordingly, a closure head for closing a container with a container closure, for example for closing a container with a screw closure in a beverage filling system, is described. The closure head includes a gripping mechanism for gripping the container closure with at least one gripping arm that can be pivoted about a bearing, and a holding jaw disposed on the at least one gripping arm for holding the container closure. The holding jaw is locked on the gripping arm by means of a pre-tensioned pressure pin.

Due to the fact that the holding jaw is locked on the gripping arm by means of a pre-tensioned pressure pin, it is possible to provide a closure head that enables rapid exchange of the holding jaw, while at the same time secure locking during closing operation. In other words, by means of the pre-tensioned pressure pin a quick-change mechanism is provided, by which the holding jaws can be rapidly and simply exchanged. The exchange of the holding jaws can, in various embodiments, take place without the use of tools.

By means of the exchange of a holding jaw disposed on the closure head for a holding jaw that is suitable for a different type of container closure, it is accordingly possible to achieve a rapid and simple conversion of the closure head for closing a container from one type of container closure to another type of container closure.

In order to install, de-install or exchange the holding jaw, the pressure pin can be displaced against its pre-tension in an axial direction. This leads to a release of the lock with which the pre-tensioned pressure pin locks the holding jaw on the gripping arm. Thus the holding jaw can be rapidly and simply installed, de-installed and/or exchanged on the gripping arm.

Additionally, by means of a closure head with such a design, a reduction can be achieved in the total number of areas that are inaccessible for cleaning, or only accessible with difficulty.

The installation, de-installation or exchange of the holding jaw can in addition take place in all areas of a machine and/or plant that includes the closure head. In particular, in the event that the closure head is used in an aseptic system, the exchange of the holding jaw can take place from a clean room window. An operator can thus exchange the holding jaw without having to enter the clean room, with the result that the changeover times can be reduced.

Accordingly, the necessary downtimes for installation, de-installation or exchange of the holding jaw are reduced in a machine and/or plant that includes such a closure head.

The gripping arm is, in several embodiments, pivotably mounted on a gripping mechanism holder by means of the bearing, wherein the gripping mechanism is, in certain embodiments, disposed on a lower end of the closure head.

The term "top" or "upper end" is here to be understood as the side, viewed in the longitudinal axis of the closure head, on which the closure head is connected to a machine or plant. Correspondingly, the term "bottom" or "lower end" is to be understood as the side facing away from the connection to the machine or plant, and pointing toward the container that is to be closed. Because, due to gravity, the non-closed containers always stand upright during closing, i.e. with their non-closed mouths facing upwards, the terms "top" and "bottom" are also clearly defined in this way.

In various embodiments, rinsing apertures are also provided on the bearing and/or the articulated joint, for example in axle mounts of the bearing and/or the articulated joint.

In some embodiments, the bearing of the gripping arm is also locked by means of the pre-tensioned pressure pin.

Due to the fact that the bearing of the gripping arm is locked by means of the pre-tensioned pressure pin, the gripping arm can also be rapidly and simply exchanged, generally without the use of tools. In addition, the bearing for mounting the gripping arm can be provided with a simple design, since, due to the locking of the bearing by means of the pre-tensioned pressure pin, the bearing is secured against release of the gripping arm, without restricting the ability of the gripping arm to pivot about the bearing. Accordingly, no additional components which could make the closure head more difficult to clean are needed in order to lock the bearing.

In one embodiment, the gripping arm is articulately connected by means of an articulated joint to a control element for controlling the pivoting of the gripping arm, and the articulated joint between the gripping arm and the control element is locked by the pre-tensioned pressure pin.

By this means, the gripping arm can also be rapidly and simply exchanged, generally without the use of tools, since in order to unlock the articulated joint it is necessary only to manipulate, i.e. to remove, the pre-tensioned pressure pin. In addition, the articulated joint can be provided with a simple design, since, due to the locking of the articulated joint by means of the pre-tensioned pressure pin, the articulated joint is secured against detachment from the gripping arm, without restricting the articulate movement of the gripping arm in the articulated joint. Accordingly, no additional components which could make the closure head more difficult to clean are needed for the articulate connection of the gripping arm with the articulated joint.

In several embodiments, a pin element, held in position by means of the pre-tensioned pressure pin, is provided for locking the gripping arm on the bearing and/or for securing the articulated joint against release, wherein the pin element is generally accommodated in a pin accommodation bore in the interior of the gripping arm.

Due to the fact that a pin element, held in position by means of the pre-tensioned pressure pin, is provided for locking the gripping arm on the bearing and/or for securing the articulated joint against release, the pressure pin can have smaller dimensions, since the pre-tensioned pressure pin for locking the bearing and/or the articulated joint only needs to hold the pin element in position. By this means, an exchange of the holding jaw can also typically take place without disturbing the locking of the articulated joint and/or the bearing. Thus the exchange of the holding jaw can take place by means of an axial displacement of the pre-tensioned pressure pin against its pre-tension, and the release of the locking of the bearing and/or the articulated joint can take place by means of removal of the pressure pin, wherein a change in the position of the pin element can be enabled by the removal of the pressure pin.

Due to the fact that the pin element is generally accommodated in a pin accommodation bore in the interior of the gripping arm, it can be achieved that the pin element is held securely in its position. In addition, this arrangement does not bring about any increase in the cleaning requirements for the closure head.

In certain embodiments, the pressure pin has a cylindrical shaft and a head area with, by comparison with the cylindrical shaft, a greater external diameter, wherein the cylindrical shaft has a locking area for creating a form closure with a recess disposed on the holding jaw for accommodating the locking area, wherein the locking area typically has the external diameter of the head area. In the direction of extraction of the holding jaw, the recess generally forms an indentation, so that a positive lock is enabled in a simple manner.

Due to the fact that the pressure pin has a cylindrical shaft and a head area with, by comparison with the cylindrical shaft, a greater external diameter, wherein the cylindrical shaft has a locking area for creating a form closure with a recess disposed on the holding jaw for accommodating the locking area, wherein the locking area generally has the external diameter of the head area, it is possible to provide secure retention of the holding jaw by the pre-tensioned pressure pin. By means of an axial displacement of the pressure pin against the pre-tension, the locking area of the pressure pin can typically be pushed out of the area of the recess, so that by this means the form closure is released and the holding jaw can be removed from the gripping arm. In its installation position, the locking area can be pressed into the recess by means of the pre-tension, with the result that the form closure is created and the holding jaw can be locked on the gripping arm. Displacement of the pre-tensioned pressure pin in an axial direction can thereby take place without the use of tools.

The holding jaw, in various embodiments, has an insertion area comprising the recess and with a circular, elliptical or polygonal cross-section, which is inserted in the gripping arm. The insertion area, in some embodiments, has an insertion slot, through which the shaft of the pressure pin can be pushed when the holding jaw is inserted in the gripping arm.

In several embodiments, a pre-tensioning element, for example, an elastomer and/or a spring, such as a pressure spring, is provided for pre-tensioning the pressure pin.

Due to the fact that, a pre-tensioning element, for example an elastomer and/or a spring, such as a pressure spring, is provided for pre-tensioning the pressure pin, simple and reliable pre-tensioning of the pressure pin can be provided. In addition, by this means, as part of the design of the closure head, the pre-tension acting on the pressure pin in an installed state can be determined and/or calculated. Furthermore, the pre-tension can be provided in a sustained manner.

The pre-tensioning element is, in certain embodiments, rotationally symmetrically disposed around the longitudinal axis of the pressure pin, for example, around the cylindrical region of the pressure pin. By this means it is possible to provide a pre-tension that acts evenly on the pressure pin, as well as a secure positioning of the pre-tensioning element relative to the pressure pin.

In various embodiments, a seal is provided on the head area of the pressure spring and/or between the holding jaw and the gripping arm, for sealing the interior of the gripping arm against the environment.

Due to the fact that a seal is provided on the head area of the pressure spring and/or between the holding jaw and the gripping arm for sealing the interior of the gripping arm against the environment, the ease of cleaning the closure head can be further improved. The interior of the gripping arm, and/or, in particular, areas which cannot be accessed by a cleaning apparatus during cleaning sufficiently to provide an adequate cleaning outcome are sealed against the environment by means of the seal. In addition, the provision of the seal prevents filling product that sloshes out of the container that is to be closed, or other contamination, from accumulating and/or forming deposits in the areas that are sealed off.

In certain embodiments, the bearing has a bearing pin, about which the gripping arm is pivotable and which is held in a fixed position in its longitudinal axis by means of the pre-tensioned pressure pin.

Due to the fact that the bearing has a bearing pin, about which the gripping arm is pivotable and which is held in a fixed position in its longitudinal axis by means of the pre-tensioned pressure pin, a very simple and stable bearing can be provided. In addition, such a bearing is easy to seal, generally by providing sealing rings between the bearing pin and its receptacle.

The retention of the bearing pin in a fixed position by the pressure pin can be provided by means of the provision of a recess, for example a groove, in which the pressure pin engages in a form-fitting manner. Alternatively, the recess, for example the groove, can interact with the pin element that is positioned by the pressure pin, or with a further element which aids the pressure pin to lock the bearing.

In one embodiment, the articulated joint has a connecting pin, which is held in a fixed position in its longitudinal axis by means of the pre-tensioned pressure pin.

Due to the fact that the articulated joint has a connecting pin which is held in a fixed position in its longitudinal axis by means of the pre-tensioned pressure pin, a very simple and stable articulated joint can be provided. In addition, such an articulated joint is easy to seal, for example by providing sealing rings between the connecting pin and its receptacle.

The retention of the connecting pin by the pressure pin in the fixed position can be provided by means of the provision of the recess, for example the groove, in which the pressure pin engages in a form-fitting manner. Alternatively the recess, for example the groove, can interact with the pin element that is positioned by the pressure pin, or with a further element which aids the pressure pin to lock the articulated joint.

In certain embodiments, the pressure pin has a securing arrangement, which enables an axial displacement of the pressure pin and provides a securing of the pressure pin against slipping out of the gripping arm, and which typically includes a screw, a sphere and, disposed perpendicular to the longitudinal axis of the pressure pin, a threaded hole for accommodating the screw and the sphere.

Due to the fact that the pressure pin has a securing arrangement, which enables an axial displacement of the pressure pin and provides a securing of the pressure pin against slipping out of the gripping arm, it can be achieved that the pressure pin is displaceable in an axial direction. Hence the pressure pin can be displaced within the range of movement provided by the securing arrangement, against the pre-tension, from a position in which the holding jaw is locked to a position in which the holding jaw is unlocked.

If the securing arrangement includes a screw, a sphere and, disposed perpendicular to the longitudinal axis of the pressure pin, a threaded hole for accommodating the screw and the sphere, a particularly simple and reliable securing arrangement can be provided. In a non-installed state, the sphere and the screw are disposed in the threaded hole. Following the insertion of the pressure pin in the gripping arm, the screw can be tightened, so that the sphere partly emerges from the pressure pin and generally engages in a securing recess of the gripping arm. The securing recess extends in the axial direction of the pressure pin. In the region of the securing recess, the pressure pin can be displaced axially, for example by the sphere rolling between the screw and the securing recess. The pressure pin can be prevented from falling out by a form closure in the axial direction of the pressure pin, which is formed by contact of the sphere with a wall of the securing recess and with the threaded hole.

In other embodiments, the gripping arm has a bore for accommodating the pressure pin.

Due to the fact that the gripping arm has a bore for accommodating the pressure pin, a closure head that is particularly easy to clean can be provided, since only a mouth of the bore needs to be sealed, and the gripping arm otherwise has no areas upon which foreign substances could form deposits, or which could not be satisfactorily accessed by the cleaning apparatus. A secure accommodation and positioning of the pressure pin is further provided by this means.

A closure head for closing a container with a container closure, for example for closing a container with a screw closure in a beverage filling system, is described. The closure head includes a gripping mechanism holder and a stop for positioning the container closure in the axial direction of the container lid. The stop is locked to the gripping mechanism holder by means of a pre-tensioned pressure pin.

Due to the fact that the stop is locked on the gripping mechanism holder by means of a pre-tensioned pressure pin, it is possible to provide a closure head that enables a quick change of the stop. In other words, by means of the pre-tensioned pressure pin, a quick-change mechanism is provided, by means of which the stop can be exchanged rapidly and simply. In certain embodiments, the exchange of the stop can take place without the use of tools. If the stop is exchanged for a stop which is suitable for positioning another type of container closure, rapid and simple conversion of the closure head can be provided.

To install, de-install or exchange the stop, the pressure pin can be displaced against its pre-tension in an axial direction, bringing about a release of the lock with which the pre-tensioned pressure pin locks the stop to the gripping mechanism holder. The stop can thereby be rapidly and simply installed on the gripping mechanism holder, de-installed and/or exchanged.

In addition, by means of a closure head with such a design, the total number of areas that are inaccessible for cleaning, or only accessible with difficulty, can be reduced to a minimum.

The installation, de-installation or exchange of the stop can furthermore take place in all areas of a machine and/or plant that includes the closure head. In particular, in the event that the closure head is used in an aseptic system, the exchange of the stop can take place from a clean room window. An operator can thus exchange the stop without having to enter the clean room.

In various embodiments, a seal is provided on the stop for sealing a stop accommodation pocket against the environment, and/or a seal is provided on the pressure pin for sealing the interior of the gripping mechanism holder against the environment.

Due to the fact that a seal is provided on the stop for sealing a stop accommodation pocket against the environment, and/or a seal is provided on the pressure pin for sealing the interior of the gripping mechanism holder against the environment, the ease of cleaning the closure head can be further improved. By means of the seal, the interior of the gripping mechanism holder, and/or in particular areas which cannot be accessed by a cleaning apparatus during cleaning sufficiently to provide an adequate cleaning outcome can be sealed against the environment. In addition, the provision of the seal prevents filling product that sloshes out of the container that is to be closed, or other contamination, from accumulating and/or forming deposits in the areas that are sealed off.

In another embodiment of all closure heads described above, the gripping arm is pre-tensioned in the direction of opening by a pre-tensioning element, for example a pressure spring. In this manner it can be achieved that in the event of loss of the control of the gripping mechanism of the closure head during operation, collisions and damage to the system can be avoided. In particular, if the supply of working medium for the gripping mechanism fails, for example the pneumatic air fails, it is possible to avoid collisions between container closures held by the gripping mechanism and containers that are already closed, or between a container closure held in the gripping mechanism and a new container closure that is supplied on a picking wheel. By means of the pre-tension of the gripping mechanism in the direction of opening, it can be achieved that in the event of loss of the control, for example due to the loss of the pneumatic air, container closures that have been picked up fall out of the gripping mechanism when it is opened by the pre-tension, and no new container closures are picked up.

A closure head for closing a container with a container closure, for example for closing a container with a screw closure in a beverage filling system, is described. The closure head includes a gripping mechanism with at least one gripping arm for gripping the container closure. The gripping arm is pre-tensioned in the direction of opening.

In this manner it can be achieved that, in the event of loss of the control of the gripping mechanism of the closure head during operation, collisions and damage to the plant can be avoided. In particular, if the supply of working medium for the gripping mechanism fails, for example the pneumatic air fails, it is possible to avoid collisions between container closures held by the gripping mechanism and containers that have already been closed, or between a container closure held in the gripping mechanism and a new container closure that is supplied on a picking wheel. By means of the pre-tension of the gripping mechanism in the direction of opening, it can be achieved that in the event of loss of the control, for example due to the loss of the pneumatic air, container closures that have been picked up fall out of the gripping mechanism when it is opened by the pre-tension, and no new container closures are picked up.

This further avoids damage to filled containers that are to be closed, and the contamination of the clean room of the beverage filling system by product and/or fragments. In addition, by this means undesired downtimes for cleaning the plant can be reduced or avoided completely.

By means of the pre-tension in the opening direction, it can also be achieved that the closing of the gripping mechanism must be actively driven, namely under the control of a control device. In other words, the gripping and releasing of the container closures can be actively driven, so that improved control can result. Due to the active closing of the gripping mechanism, the holding force applied to a container closure can be actively varied, and adapted to differing container closure types, geometries and material combinations. It is thereby possible to reduce or avoid completely the application of too great a holding force, with the accompanying effects such as distortion or scratching of the container closure. It can accordingly be achieved that the handling of the container closure is as gentle as possible, with at the same time secure closing of the containers.

In one embodiment, the gripping arm is pre-tensioned by a pre-tensioning element, for example a pressure spring.

In another embodiment, the pre-tensioning element is disposed in an actuating cylinder, for example a pneumatic cylinder.

Due to the fact that the pre-tensioning element, generally a pressure spring, is disposed in the actuating cylinder, the number of parts in the clean room that are difficult to clean can be reduced, since the actuating cylinder itself provides an enclosure for the pressure spring.

In some designs of the system, the actuating cylinder is disposed outside the clean room, so that in this manner the pre-tensioning element is also disposed outside the clean room, which may be advisable due to hygienic considerations. Because the pre-tensioning element is disposed in the actuating cylinder, the ability to clean the closure head is greatly improved. This arrangement is therefore particularly suitable for use in aseptic beverage filling systems.

The closure head that has been described, with the gripping arm or arms pre-tensioned in the opening direction, can also be particularly advantageously combined with the embodiments described earlier herein, in which the holding jaws and/or the bearings and/or the stops are locked by means of pre-tensioned pressure pins.

BRIEF DESCRIPTION OF THE FIGURES

Further embodiments of the invention are more fully explained by the description below of the figures.

DETAILED DESCRIPTION

Examples of embodiments are described below with the aid of the figures. In the figures, elements which are identical or similar, or have identical effects, are designated with identical reference signs. In order to avoid redundancy, repeated description of these elements is in part dispensed with.

Figure 1A:
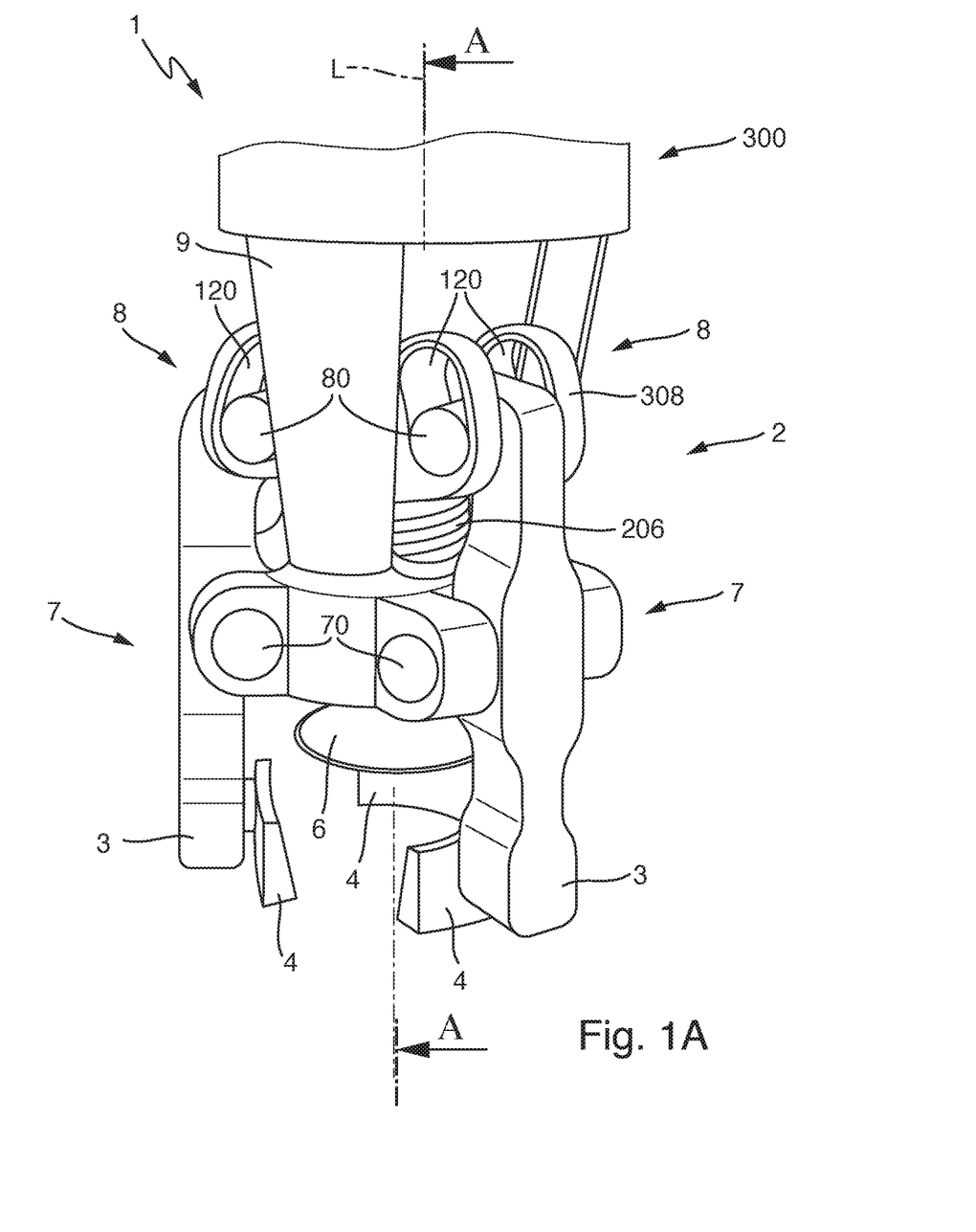
FIG. 1A is a schematic perspective side elevation of a closure head with a spring-closing gripping mechanism.

FIG. 1A shows schematically a perspective side elevation of a closure head 1 with a spring-closing gripping mechanism 2 for gripping and holding a container closure 17 during the closing of a container that is to be closed. The closure head 1 extends along a longitudinal axis L. This longitudinal axis L also defines the axis of symmetry of the container closure 17, and, in the case of a screw closure, coincides with the axis of rotation of the screw closure when it is screwed onto the container, and hence also with the axis of the container when the closure is being screwed on.

On a gripping mechanism holder 9 that is provided on the closure head 1, three gripping arms 3 are disposed, spaced evenly around the periphery of the closure head 1 and in each case disposed on the gripping mechanism holder 9 such that they are pivotable by means of a bearing 7. Each of the gripping arms 3 thus forms an angle of 120° with its neighboring gripping arms 3 in a plane that is perpendicular to the longitudinal axis L. In this embodiment, the bearing 7 is designed as a trunnion bearing with a bearing pin 70. Alternatively, other bearing types or variants can be used.

A holding jaw 4 is disposed at the lower end of each gripping arm 3, wherein the closure head 1 can grip and hold, by means of the holding jaws 4, a container closure 17 that is to be applied to the container that is to be closed. On their upper end, the gripping arms 3 are articulately jointed, via an articulated joint 8, with a control element 308 for controlling the gripping mechanism 2. To form the articulated joint, on each gripping arm 3 a connecting pin 80 is disposed, which engages with an elongated hole tab 120 of the control element 308 which is disposed on each side of each gripping arm 3. The elongated hole tabs 120 are formed such that the connecting pin 80 can slide along the respective elongated holes.

The elongated hole tabs 120 of the control element 308 are oriented obliquely to the longitudinal axis L. The upper ends of the elongated hole tabs 120 are thereby closer to the longitudinal axis L than the lower ends. The upper ends of the elongated hole tabs 120 are thus disposed in a circle with a smaller radius than the circle in which the lower ends of the elongated hole tabs 120 are disposed. By means of this arrangement of the elongated hole tabs 120, the gripping mechanism 2 is in a closed state when, as shown in FIG. 1A, the connecting pins 80 are in each case at the lower ends of the elongated hole tabs 120. This is because the connecting pins 80 are pressed outwards to the greater radius by the elongated hole tabs 120, so that the gripping arms 3 are rotated about the bearing pins 70 such that the holding jaws 4 are in the closed position. The gripping mechanism can thus be opened by means of an appropriate upwards displacement of the connecting pins 80 along the elongated hole tabs 120 due to a displacement of the control element 308, as the connecting pins 80 are forced by the elongated hole tabs 120 to adopt a smaller radius, and the gripping arms 3 accordingly pivot about the bearing pins 70 to the open position.

The elongated hole tabs 120 typically have a linear design. Alternatively, however, depending on the desired motion profile of the gripping arms 3, curved elongated hole tabs 120 can be used, in order to achieve different dependencies between the height position of the control element 308 and the corresponding opening position of the holding jaws 4.

In this spring-closing embodiment of the closure head 1, the control element 308 is pressed by a pressure spring 302 disposed concentrically to the longitudinal axis L on the upper side of the closure head 1, so that in the situation represented in FIG. 1 the connecting pins 80 are at the lower ends of the elongated hole tabs 120, and the gripping arms 3, and thus also the holding jaws 4, are in the closed position in which a container closure could be gripped. By means of the spring-closing design, in the absence of further actuation of the control element 308 the container closure would also be held securely between the holding jaws 4, due to the spring pre-tension of the pressure spring 302.

Above the control element 308, an actuating cylinder is disposed concentrically to the longitudinal axis L. If the actuating cylinder extends, it presses on the control element 308 and displaces it in the direction of the lower side of the closure head 1 against the spring tension applied by the pre-tensioning element 302. By this means the connecting pins 80 slide in the elongated hole tabs 120 in the direction of their upper ends, which effects a pivoting of the gripping arms 3. Because the upper ends of the elongated hole tabs 120 are closer to the longitudinal axis L, the gripping arms 3 pivot about the bearing 7, so that the holding jaws 4 are displaced outwards, and the gripping mechanism 2 is therefore in an open position.

In order to position the container closure that is to be gripped, a stop 6 is disposed on the gripping mechanism holder 9. When the container closure is gripped, the stop 6 comes into contact with the upper side of the container closure, so that the container closure is arranged in a defined position with respect to the longitudinal axis L. and is held securely by the holding jaws 4 in a correct container closure position.

Figure 1B:
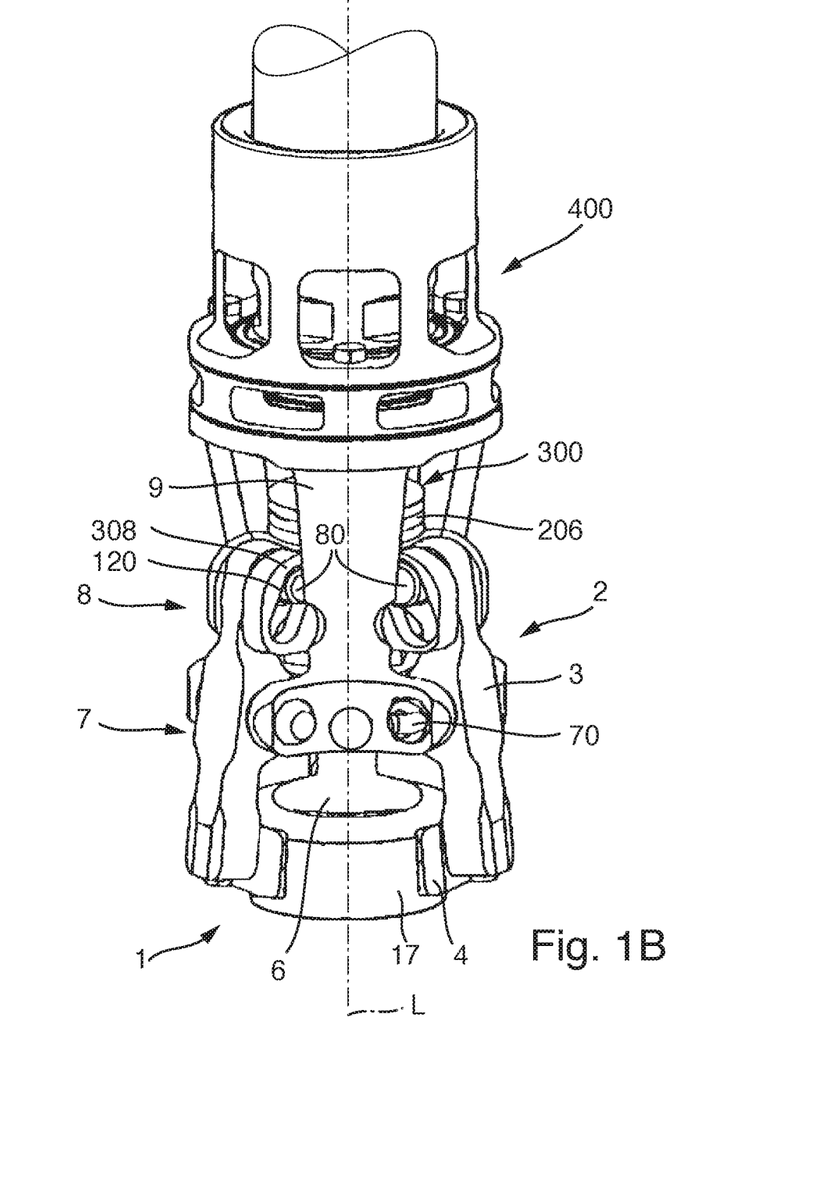
FIG. 1B is a schematic perspective side elevation of a closure head with a spring-opening gripping mechanism.

FIG. 1B shows an alternative closure head 1 which has a spring-opening gripping mechanism. This closure head 1 has in principle the same elements as that shown in FIG. 1A. However, in this case the control element 308 is pre-tensioned in the opening direction of the gripping arms 3, i.e. pre-tensioned in a downwards direction. This position is shown in FIG. 1B, and the gripping arms 3 are pivoted outwards, so that the gripping mechanism is open and the gripping arms 3 can be guided over the container closure 17, as shown in FIG. 1B. In other words, in the absence of further actuation the gripping mechanism is in the open position, such that a container closure would fall out of the gripping mechanism.

By means of a control device 300, which in the example embodiment that is shown has an actuating cylinder, the control element 308 can now be actively displaced upwards, in order actively to close the gripping arms 3 by pivoting them about the bearing pins 70. By means of the control device 300, the control element 308 can thus be actively controlled, so that the gripping arms 3 are pivoted in the closing direction and a container closure can accordingly be held between the holding jaws 4. The strength of the clamping effect applied by the holding jaws 4 is determined by the control device 300, and in particular by the actuating cylinder.

Figure 7:
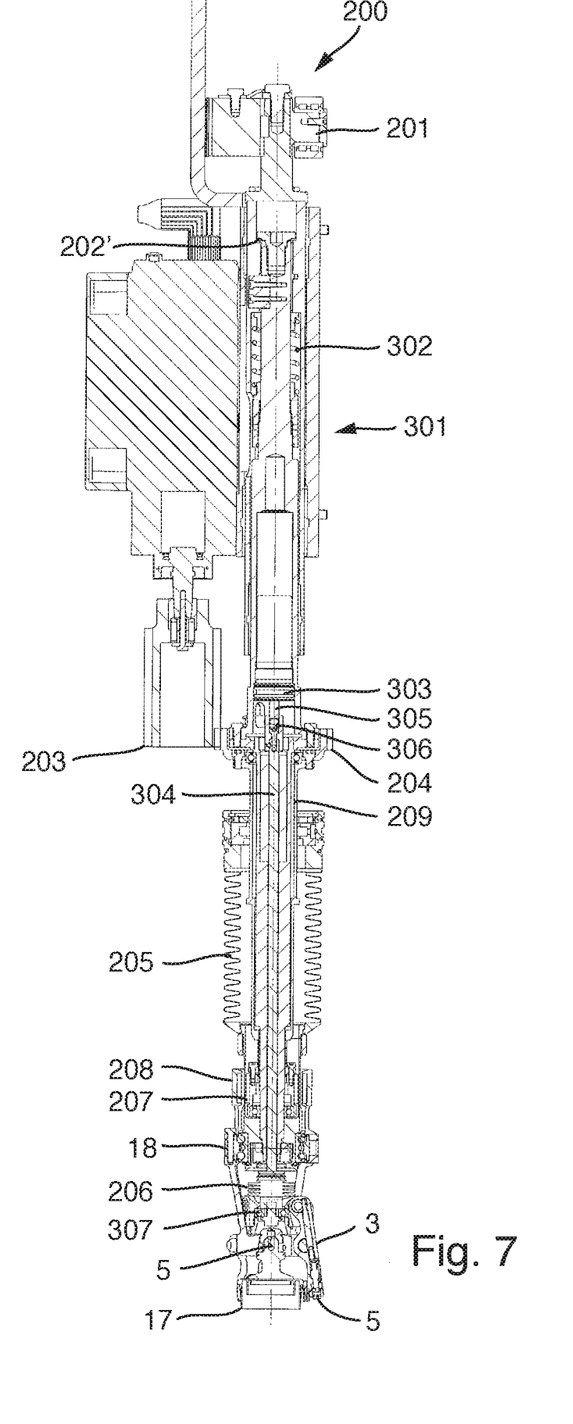
FIG. 7 is a schematic sectional view of the closure head from FIG. 6.

A pre-tensioning element 302 for applying a pre-tension in the direction of opening, as shown for example in FIG. 7, is provided in the form of a spring in the actuating cylinder 301. The pre-tensioning element 302 in the form of a spring acts in the direction of opening on the piston 303 of the actuating cylinder 301, and thereby, via an actuating rod 304, on the control element 308. The pre-tensioning element 302 can accordingly act directly on the control element 308, applying a force in the direction of opening. By charging the actuating cylinder 301 with pneumatic air, the piston 303 can be lifted against the pre-tension, and via the actuating rod 304 the control element 308 is correspondingly lifted, so that a pivoting of the gripping arms 3 in the direction of closing can be achieved and a container closure can be held.

Figure 2A:
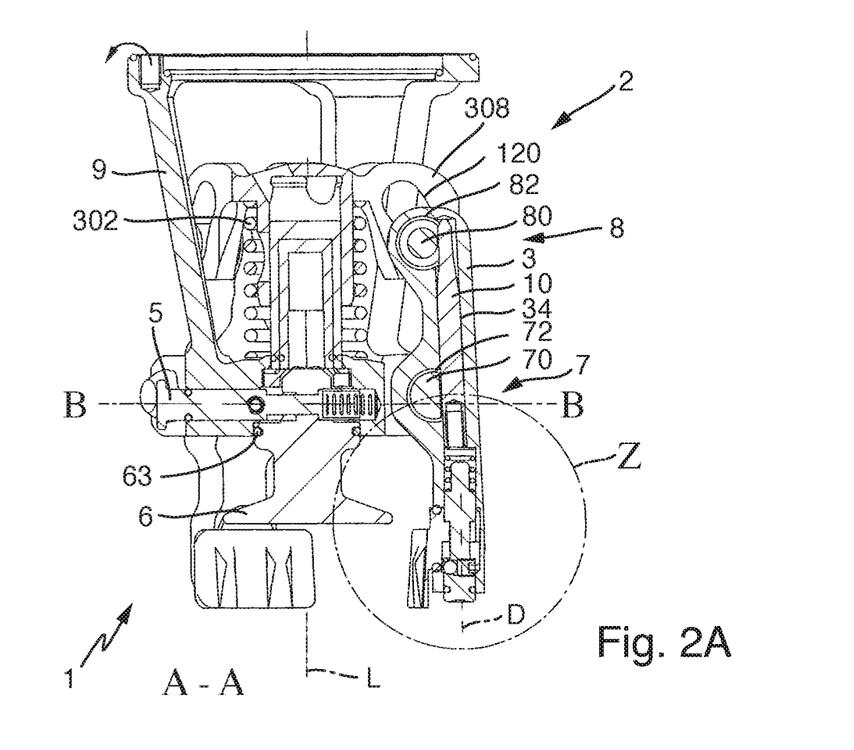
FIG. 2A is a schematic sectional view of the closure head from FIG. 1A along the line of intersection A-A.

FIG. 2A shows a sectional view of the closure head 1 with the spring-closing gripping mechanism 2 from FIG. 1A. In this case, no container closure is shown held between the gripping arms 3.

Figure 2B:
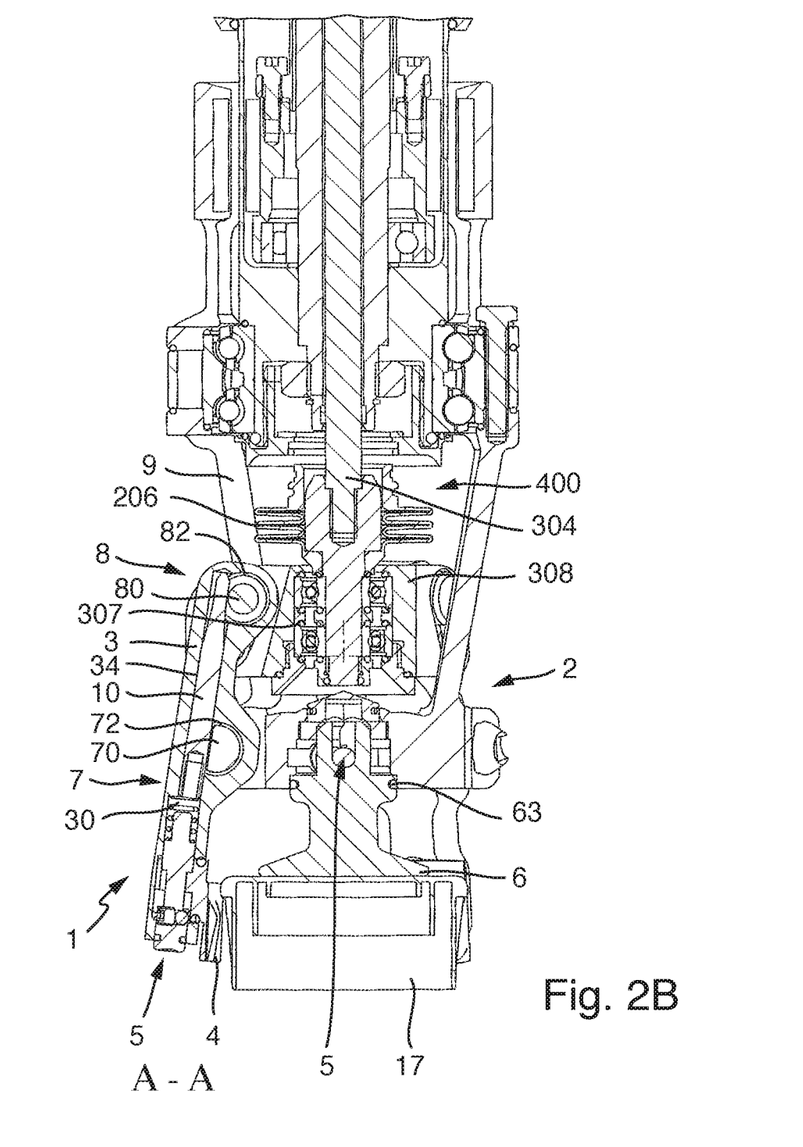
FIG. 2B is a schematic sectional view of the closure head from FIG. 1B along the line of intersection A-A.

FIG. 2B shows schematically a sectional view of the closure head 1 with the spring-opening gripping mechanism 2 from FIG. 1B. In this case, a schematically represented container closure 17 is held by the gripping mechanism 2.

The container closure 17 is positioned with its upper side abutting the stop 6, and is held by the three holding jaws 4, which have been guided onto it radially from outside via the gripping arms 3. By means of the control device 300, via the control element 308 and the gripping arms 3, a holding pressure which can be determined via the dimensioning of the closure head 1 is exerted on the container closure 17 by the holding jaws 4, enabling secure holding of the container closure 17 and reliable closing of the container to be closed with the container closure 17.

Figure 3:
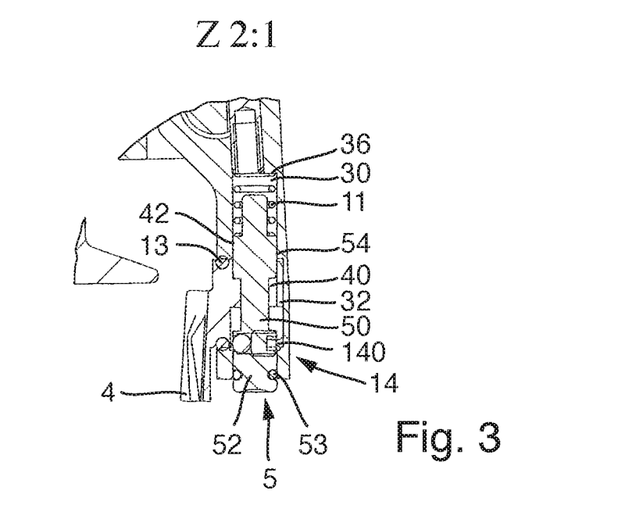
FIG. 3 is a detailed view Z of a holding jaw from FIG. 2A.

FIG. 3 shows a detail view Z of the quick-change mechanism of the holding jaws 4 from FIG. 2A. Each of the gripping arms 3 has a bore 30 in which is disposed a pressure pin 5, which has a cylindrical shaft 50 and a head area 52. The head area 52 of the pressure pin 5 has a greater external diameter than the cylindrical shaft 50. Between the head area 52 and the gripping arm 3, a seal 53 is disposed to seal the bore 30 against the environment when the pressure pin 5 is inserted.

In addition, on the cylindrical shaft 50 of the pressure pin 5 a locking area 54 is disposed, which in the example embodiment that is shown has the external diameter of the head area 50. Between the locking area 54 and a shoulder 36 of the bore 30, an elastic pre-tensioning element 11 in the form of a helical spring is disposed. The pre-tensioning element 11 is in a tensioned state, and thus presses against the locking area 54, pushing it in a direction out of the bore 30.

In order to prevent the pressure pin 5 from displacing fully out of the bore 30, a securing arrangement 14 is provided, which enables axial displacement of the pressure pin 5 while at the same time securing the pressure pin 5 against falling out of the gripping arm 3. For this purpose a screw 140 is screwed into a threaded hole that is perpendicular to the pressure pin axis D of the pressure pin 5, and by this means a sphere is positioned which partially protrudes from the pressure pin 5 and engages in a securing recess 32 of the gripping arm 3, which extends in the axial direction of the pressure pin 5. In the region of the securing recess 32, the pressure pin 5 is axially displaceable by means of a rolling of the sphere between the screw 140 and the securing recess 32. Displacement of the pressure pin 5 out of the bore 30 is prevented by a form closure in the axial direction of the pressure pin 5, made by the sphere due to contact with a side wall of the securing recess 32 and with a wall of the threaded hole.

In each gripping arm 3, the applicable holding jaw 4 is inserted by an insertion area 40 in the gripping arm 3, and locked by means of the pre-tensioned pressure pin 5. The locking area 54 of the pressure pin 5 engages in a complementary recess 42 of the holding jaw 4, wherein the pre-tensioning element 11 presses the locking area 54 into the recess 42. By this means, a pre-tensioned form closure is provided between the pressure pin 5 and the holding jaw 4. In order to seal the interior of the gripping arm against the environment, a seal 13 is disposed between the holding jaw 4 and the gripping arm 3.

In order to de-install the holding jaw 4, the pressure pin 5 is axially displaced against the pre-tension in the direction of the pre-tensioning element 11. By this means the locking area 54 is pushed out of the recess 42, so that the form closure is removed and the holding jaw 4 can be pulled out of the gripping arm 3.

In order to install another holding jaw 4, the pressure pin 5 must accordingly be displaced again in the direction of the pre-tensioning element 11, so that the holding jaw 4 can be inserted in the gripping arm 3. After insertion of the holding jaw 4 and the release of the pressure pin 5, its locking area 54 is pushed back into the recess 42 of the holding jaw 4, and the holding jaw 4 is thereby locked in the gripping arm 3.

Figure 5:
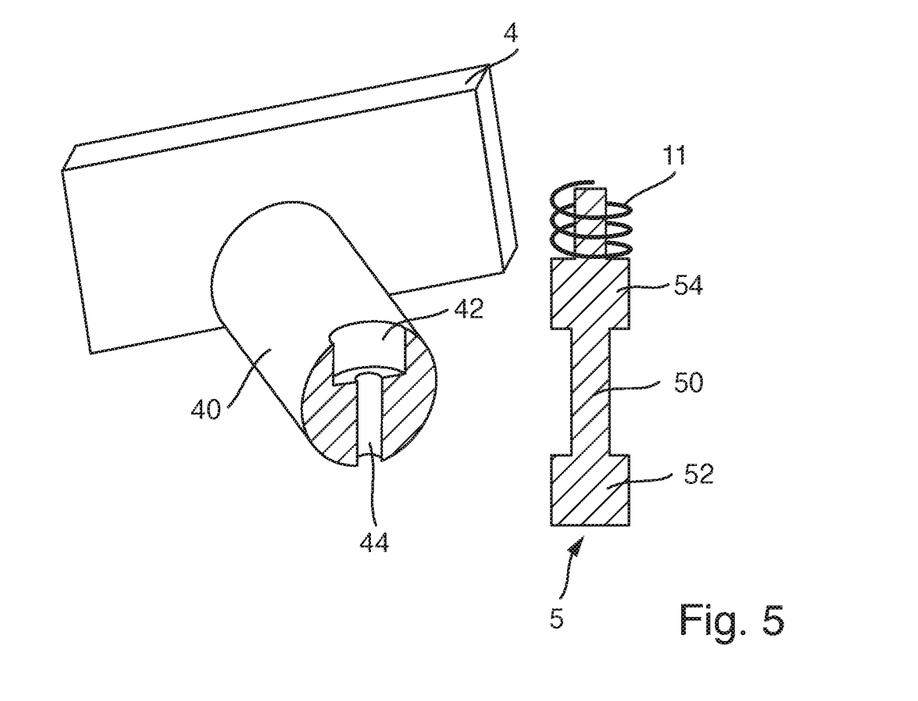
FIG. 5 is a partially sectional perspective view of a holding jaw and a pressure pin.

A representation of the principle of the holding jaw 4 and the pressure pin 5 is again shown in FIG. 5, which shows a partially sectional perspective view of the holding jaw 4 and the pressure pin 5. From this it can be seen that the insertion area 40 of the holding jaw 4 is provided with an insertion slot 44, which is designed such that the shaft 50 of the pressure pin 5 can be inserted therein.

In order to install the holding jaw 4, the insertion area 40 is accordingly inserted into the recess in the gripping arm 3 that is complementary to it. In FIG. 5, the insertion area 40 is shown with a circular cross-section. It can however also have an elliptical or polygonal cross section—for example in order to prevent rotation. When the insertion area 40 is inserted into the gripping arm 3, the insertion slot 44 slides over the shaft 50 of the pressure pin 5. When the holding jaw 4 is installed, the pressure pin 5 is thus pushed into the bore 30 against the pre-tension of the pre-tensioning element 11 such that the locking area 54 is raised far enough not to collide with the insertion area 40 of the holding jaw 4. Instead, only the shaft 50 interacts with the insertion area 40 and in particular the insertion slot 44.

If the insertion area 40 is pushed far enough into the gripping arm 3, the pressure pin 5 is able to move in the direction of the pre-tension. The pressure pin 5 thereby displaces relative to the insertion area 40, and the locking area 54 engages with the recess 42 that is complementary to it. The recess 42 forms an indentation in the direction of extraction of the insertion area 40. By means of the form closure that is produced in this manner, a locking of the holding jaw 4 on the gripping arm 3 can be achieved. In the locked position, the holding jaw 4 can thus no longer be pulled out of the gripping arm 3.

For de-installation, the pressure pin 5 can again be displaced against the pre-tension, so that the locking area 54 lifts out of the recess 42, and the form closure is thereby removed. The insertion area 40 can then be pulled out of the gripping arm 3 the direction of extraction, wherein the shaft 50 of the pressure pin 5 is guided through the insertion slot 44.

As can be seen from FIGS. 2A and 2B, the gripping arm 3 also has a pin accommodation bore 34, in which a pin element 10 is accommodated. The pin accommodation bore 34 adjoins the bore 30 for accommodating the pressure pin 5.

The pin element 10 is positioned and held via the pre-tensioned pressure pin 5, wherein the pressure pin, in the embodiment that is shown, presses the pre-tensioning element 11 against an end face of the pin element 10. Alternatively, in order to position the pin element 10 the pressure pin 5 can be in direct contact with the pin element 10.

With the aid of the pin element 10, the bearing 7 is locked by means of the pressure pin 5. For this purpose, the pin element 10, which is positioned by the pressure pin 5, engages in a groove 72 of the bearing pin 70, so that the latter is held in a fixed position with respect to its longitudinal axis. By this means, secure locking of the bearing pin 70, and thereby of the bearing 7, can be provided by the pressure pin 5, without inhibiting the pivoting of the gripping arm 3 about the bearing 7.

The articulated joint 8 between the gripping arm 3 and the control element 308 is also locked by the pre-tensioned pressure pin 5. For this purpose, the pin element 10, which is positioned by the pressure pin 5, engages in a groove 82 of the connecting pin 80, so that the latter is held in a fixed position with respect to its longitudinal axis. By this means, secure locking of the connecting pin 80, and thereby of the articulated joint 8, is provided by the pressure pin 5.

In order to exchange the gripping arm 3, it is necessary to remove the pressure pin 5 and the pin element 10. The connecting pin 80 and the bearing pin 70 can then be displaced axially out of the bearing, so that the gripping arm 3 can be removed and if necessary replaced by another gripping arm. The replacement gripping arm can then be attached to the closure head 1 by means of the insertion of the bearing pin 70, or another bearing pin, into the bearing 7, and the insertion of the connecting pin 80, or another connecting pin, into the articulated joint 8. The articulated joint 8 and the bearing 7 must be locked by means of the insertion of the pressure pin 5 into the replacement gripping arm. Similarly, the pin element 10 can again be used to lock the articulated joint 8 and/or the bearing 7 via the pressure pin 5, or else another pin element with the appropriate geometry can be used.

The stop 6 is inserted concentrically to the longitudinal axis L in a stop accommodation pocket 90 of the gripping mechanism holder 9, and locked by means of a further pre-tensioned pressure pin 5. In order to seal the stop accommodation pocket 90 against the environment, a seal 13 is disposed between the stop 6 and the gripping mechanism holder 9.

Figure 4:
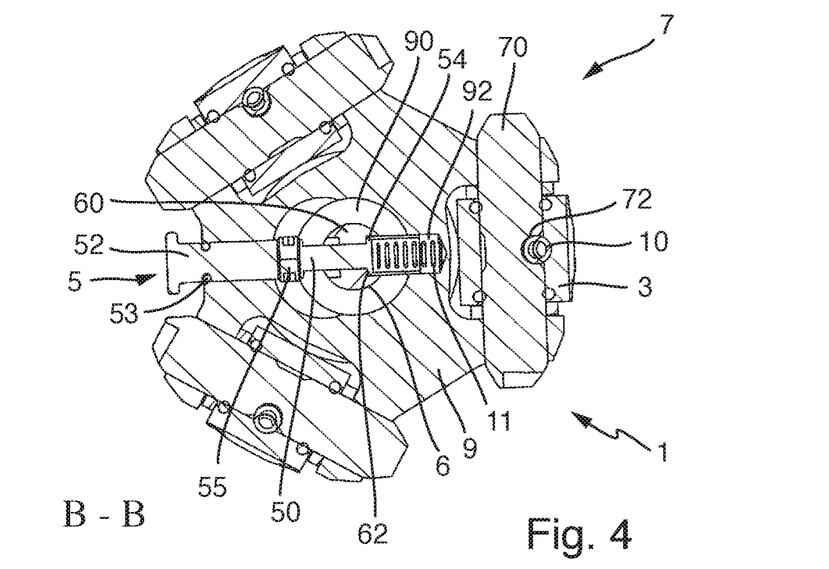
FIG. 4 is the closure head from FIG. 1A in a schematic sectional view along the line of intersection B-B from FIG. 1A.

FIG. 4 shows the closure head 1 from FIG. 2B in a schematic sectional view along the line of intersection B-B from FIG. 2B. The pin element 10 accommodated in the pin accommodation bore 34 of the gripping arm 3 engages the groove 72 of the bearing pin 70, thereby locking the bearing pin 70 and thus also the bearing 7 in the axial direction of the bearing pin 70.

A pressure pin 5 disposed in an accommodation bore 92 of the gripping mechanism holder 9 has a cylindrical shaft 50 and a head area 52, wherein the head area 52 has a greater external diameter than the cylindrical shaft 50. Between the head area 52 and the gripping mechanism holder 9, a seal 53 is disposed to seal the accommodation bore 92 against the environment. In addition, on the cylindrical shaft 50 a locking area 54 is disposed, which has the external diameter of the head area 50. In order to pre-tension the pressure pin 5, an elastic pre-tensioning element 11 in the form of a helical spring is disposed between the locking area 54 and the base of the accommodation bore 92. The pre-tensioning element 11 is in a tensioned state, and thus presses against the locking area 54.

In the closure head 1, the stop 6 is locked, typically centrally, by means of the pre-tensioned pressure pin 5 to the gripping mechanism holder 9, wherein the insertion area 60 of the stop is inserted in a stop accommodation pocket 90 of the gripping mechanism holder 9. The locking area 54 of the pressure pin 5 thereby engages in a complementary recess 62 of the stop 6, wherein the pre-tensioning element 11 presses the locking area into the recess 62. By this means, a tensioned form fit is provided between the pressure pin 5 and the stop 6.

In order to de-install the stop 6, the pressure pin 5 must be pressed against the pre-tension axially in the direction of the pre-tensioning element 11. This pushes the locking area 54 out of the recess 62, so that the form closure is removed and the stop 6 can be removed from the gripping mechanism holder 9. Following the removal of the stop 6, the pressure pin 5 is pressed by the pre-tensioning element 11 into the form closure described above, which is created by the securing arrangement.

In order to install another stop 6, the pressure pin 5 must correspondingly be displaced again in the direction of the pre-tensioning element 11, so that the stop 6 can be inserted in the gripping mechanism holder 9. After insertion of the stop 6 and the release of the pressure pin 5, its locking area 54 is pushed back into the recess 62, and the stop 6 is thereby locked in the gripping mechanism holder 9.

Figure 6:
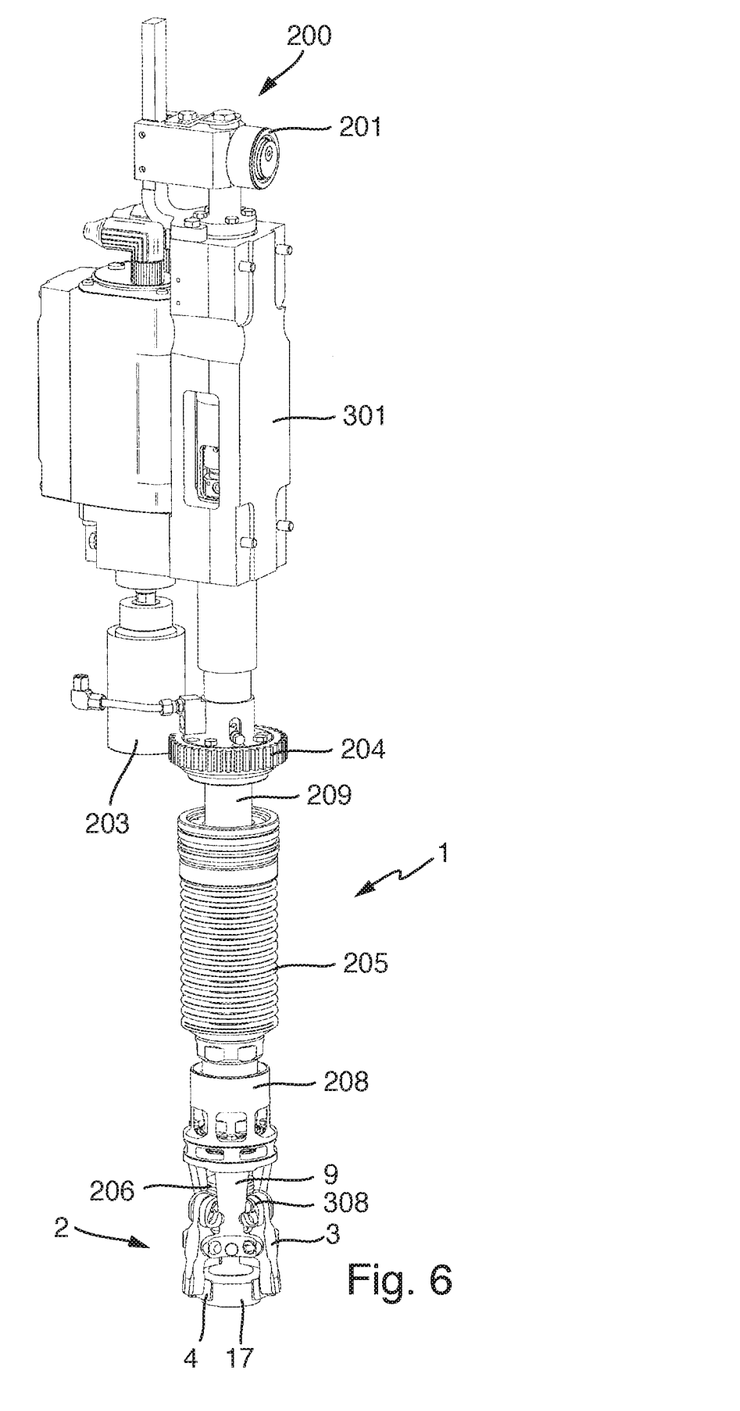
FIG. 6 is a closure head for applying a container closure to a container that is to be closed.

FIG. 6 shows a closure head 1 for applying a container closure 17 to a container that is to be closed, and FIG. 7 shows a schematic sectional view through this closure head 1.

The container closure 17 is held in the closure head 1 by the gripping mechanism 2, and can be applied to the container, i.e. screwed onto it. The lift required to take the container closure 17 from a picking wheel, for subsequent transport of the container closure 17 to a position above the mouth area of the container that is to be closed, and to lower the container closure 17 onto the mouth, is supplied to the closure head 1 via a roller 201.

If the closure head 1 is incorrectly lowered onto the container to be closed or the picking wheel, or otherwise collides with the container, the resulting shock can be absorbed by means of a shock absorption element 202.

The torque required to screw a container closure 17 onto a container that is to be closed is transmitted from a drive pinion 203 driven by a drive, via a drive wheel 204, to a rotation sleeve 209. The transmission of the torque from the rotation sleeve 209 to the gripping mechanism holder 9 takes place via a seal-welded magnet system for use in a clean room, including an outer magnet 208 for transmission and an inner magnet 207 for reception of the torque. A bearing 307 serves to transmit the opening and closing movements from the stationary part to the rotating part.

Accordingly, the torque can act on the gripping arms 3 from the rotation sleeve 209 via the gripping mechanism holder 9, and thereby also act on the container closure 17 held between the gripping arms 3. By this means the container closure 17 can then be screwed onto the container.

Because the closure head 1 shown in FIGS. 6 and 7 is typically to be used for the hygienic filling and closing of containers, two sealing components are additionally provided, for example in the form of bellows. The first sealing component 205 serves to seal the clean room against the environment. The second sealing component 206 serves to seal the control device 300 of the gripping mechanism 2.

The closure head 1 includes both a lifting device 200 for lifting and lowering the closure head 1 onto the container to be closed, and the control device 300 for controlling the gripping mechanism 2. The control device 300 includes an actuating cylinder 301, a piston rod 305 which is fixedly connected with the actuating rod 304, and a bearing 307, which is connected with the control element 308 such that the movement of the actuating cylinder 301 is transmitted to the control element 308.

Figure 8:
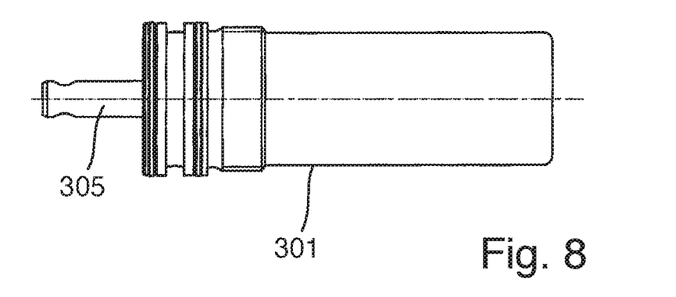
FIG. 8 is a schematic representation of an actuating cylinder.
Figure 9:
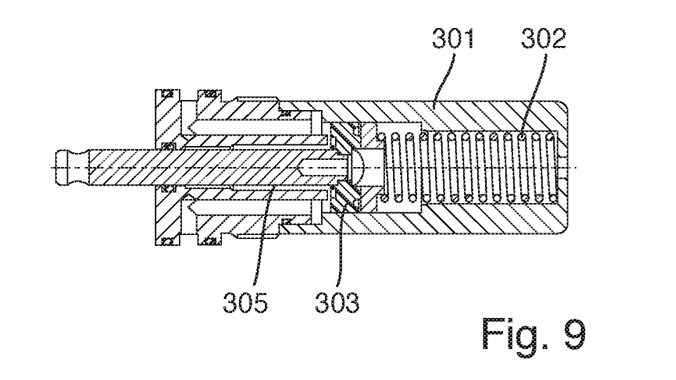
FIG. 9 is a schematic sectional view through the actuating cylinder from FIG. 8.

FIG. 8 shows an actuating cylinder 301 of the control device 300, from which the piston rod 305 protrudes. FIG. 9 shows the actuating cylinder 301 in a schematic sectional view.

In order to effect the spring-aided opening of the gripping arm 3 of the spring-opening closure head 1 that is shown in FIG. 1B, a force must act on the control element 308 in the direction of the underside of the closure head 1, so that the connecting pins 80 are displaced in the elongated hole tabs 120 in the direction of the upper ends of the tabs. Because the upper ends of the elongated hole tabs 120 are closer to the longitudinal axis L, the gripping arms 3 pivot about the bearing 7, so that the gripping mechanism 2 is in an open position.

This force to open the gripping mechanism 2 is produced by a pre-tensioning element 302 which is implemented as a spring. The pre-tensioning element, i.e. the spring, is accommodated in the actuating cylinder 301, so that a particularly hygienic design of the control device 300 can be achieved.

In the absence of a force acting by means of a working medium on the piston 303, the force of the pre-tensioning element 302 acts on the piston 303 attached to the piston rod 305, such that the piston 303 and the piston rod 305 are at the lowest point of the actuating cylinder 301. In order to close the gripping mechanism 2, the actuating cylinder 301 is charged with working medium, so that the piston 303 displaces upwards, i.e. against the direction of the spring force. By this means the piston rod 305, and hence the control element 308, displaces in the direction of the upper side of the closure head 1, so that a pivoting of the gripping arms 3 into the closed position is achieved. This is because the connecting pins 80 are displaced in the elongated hole tabs 120 in the direction of the lower ends of the tabs. Because the lower ends of the elongated hole tabs 120 are at a greater distance from the longitudinal axis L than the upper ends, the gripping arms 3 pivot about the bearing 7, so that the gripping mechanism 2 is then in a closed position.

To the extent applicable, all individual features described in the example embodiments can be combined with each other and/or exchanged, without departing from the field of the invention.

The invention claimed is:

1. A closure head for closing a container with a container closure, comprising:
    a gripping mechanism configured to grip the container closure with at least one gripping arm pivotable about a bearing;
    a holding jaw disposed on the at least one gripping arm and configured to hold the container closure; and
    a pre-tensioned pressure pin configured to lock the holding jaw on the at least one gripping arm,
    wherein the bearing of the at least one gripping arm is locked by the pre-tensioned pressure pin.

2. The closure head of claim 1, further comprising:
    a control element configured to control pivoting of the at least one gripping arm; and
    a joint locked by the pre-tensioned pressure pin and configured to connect the at least one gripping arm to the control element.

3. The closure head of claim 2, wherein the joint comprises a connecting pin that is held in a fixed position in its longitudinal axis by the pre-tensioned pressure pin.

4. The closure head of claim 1, further comprising a pin element configured to lock the at least one gripping arm on the bearing, wherein the pin element is held in position by the pre-tensioned pressure pin.

5. The closure head of claim 1, wherein the pre-tensioned pressure pin comprises a cylindrical shaft and a head area with a greater external diameter than the cylindrical shaft.

6. The closure head of claim 5, further comprising a seal disposed on the head area and/or between the holding jaw and the at least one gripping arm, wherein the seal is configured to seal an interior of the at least one gripping arm against an environment.

7. The closure head of claim 1, wherein the bearing comprises a bearing pin about which the at least one gripping arm is pivotable, and the bearing pin is held in a fixed position in its longitudinal axis by the pre-tensioned pressure pin.

8. The closure head of claim 1, wherein the pre-tensioned pressure pin is arranged to enable an axial displacement of the pre-tensioned pressure pin and to provide a securing of the pre-tensioned pressure pin against slipping out of the at least one gripping arm.

9. The closure head of claim 1, further comprising a pre-tensioning element configured to pre-tension the at least one gripping arm in a direction of opening.

10. A closure head for closing a container with a container closure, comprising:
    a gripping mechanism configured to grip the container closure with at least one gripping arm pivotable about a bearing;
    a holding jaw disposed on the at least one gripping arm and configured to hold the container closure;
    a pre-tensioned pressure pin configured to lock the holding jaw on the at least one gripping arm;
    a gripping mechanism holder; and
    a stop disposed on the gripping mechanism holder and configured to position the container closure in an axial direction of the container closure,
    wherein the bearing of the at least one gripping arm is locked by the pre-tensioned pressure pin.

11. The closure head of claim 10, wherein the gripping mechanism holder comprises a stop accommodation pocket, and further comprising a seal disposed on the stop and configured to seal the stop accommodation pocket against an environment.

12. The closure head of claim 10, further comprising a pre-tensioning element configured to pre-tension the pre-tensioned pressure pin.

13. The closure head of claim 12, wherein the pre-tensioning element pre-tensions the at least one gripping arm in a direction of opening of the gripping mechanism.

14. The closure head of claim 10, wherein the pre-tensioned pressure pin comprises a cylindrical shaft and a head area with a greater external diameter than the cylindrical shaft.

15. A closure head for closing a container with a container closure, comprising:
    a gripping mechanism configured to grip the container closure with at least one gripping arm pivotable about a bearing;
    a holding jaw disposed on the at least one gripping arm and configured to hold the container closure; and
    a pre-tensioned pressure pin configured to lock the holding jaw on the at least one gripping arm,
    wherein the bearing of the at least one gripping arm is locked by the pre-tensioned pressure pin, and
    the at least one gripping arm is pre-tensioned in a direction of opening of the gripping mechanism.

16. The closure head of claim 15, further comprising a pre-tensioning element configured to pre-tension the at least one gripping arm.

17. The closure head of claim 16, further comprising an actuating cylinder, wherein the pre-tensioning element is disposed in the actuating cylinder.

18. The closure head of claim 15, further comprising a control element and a joint, wherein the control element is connected to the at least one gripping arm by the joint and the joint is locked by the pre-tensioned pressure pin.

* * * * *